3,851,070
HIGH NUTRITION FOOD SPREADS

Frank E. Sessoms, Nashville, Tenn., and Michael E. Hardy, Cincinnati, Ohio, assignors to The Procter & Gamble Company, Cincinnati, Ohio
No Drawing. Continuation of abandoned application Ser. No. 157,772, June 28, 1971. This application Aug. 28, 1973, Ser. No. 392,361
Int. Cl. A23d 5/00; A23j 3/00
U.S. Cl. 426—177    10 Claims

ABSTRACT OF THE DISCLOSURE

A high nutrition food spread comprising hydrated and subsequently dried soy protein, sweetener, hardstock, emulsifier, citric acid, basestock, and minors such as flavoring and coloring. The spread has good consistency characteristics, excellent spreadability, and good eating quality in that little or no stickiness or grittiness is present and soy off-flavor is minimized.

---

This is a continuation of application Ser. No. 157,772, filed June 28, 1971, and now abandoned.

BACKGROUND OF THE INVENTION

This invention relates to novel high nutrition food spreads. More particularly, it relates to soy protein-based high nutrition food spreads which, because of the formulation utilized, do not have the usually attendant disadvantages of food spreads containing soy protein as a nutritional supplement.

Soy protein is a well known nutritional food supplement and has been utilized as such on many occasions. However, with specific regard to food spreads soy protein as a high nutrition supplement has heretofore had certain disadvantages. Specifically, soy protein as obtained from usual supply sources is a very hygroscopic material. Therefore, when nutritionally effective amounts of soy protein are added as a supplement to food spreads the soy protein upon contact with the mouth rapidly absorbs all available moisture, leaving a very dry sticky and gritty mouth-feel. In short, because of its hygroscopic nature the soy protein upon mouth contact rapidly removes available mouth moisture and as a result leaves the mouth somewhat dehydrated, which in turn gives the characteristic sticky and gritty feeling often characteristic of some peanut butters. In addition to poor eating quality when incorporated in nutritional food spreads heretofore, soy protein has always had the additional problem of lack of palatability. Namely, while soy protein is one of the cheapest protein sources for food nutritional supplementation, it has the disadvantage of a characteristic taste which often carries through and masks other more pleasing tastes. It has now been found that by utilizing the nutritional food spread formulation of this invention which uses specially treated soy protein, that the poor eating quality can be overcome and, in addition, the palatability of the soy protein is significantly increased.

Accordingly, it is an object of this invention to make a high nutrition soy protein-containing good spread which does not exhibit poor eating quality, i.e. sticky and gritty or sand-like mouth eating quality, and which does not have a high degree of soy protein off-flavor.

The method of accomplishing this and other objects will become apparent from the following description of the invention.

SUMMARY OF THE INVENTION

It has been discovered that the objects of this invention can be accomplished by preparing a high nutrition food spread which utilizes as the nutritional supplement soy protein which prior to incorporation into the food spread has been hydrated and subsequently dried. In addition, the food spread formulation comprises from 10% to 25% by weight sweetener, from 1.5% to 3% by weight of a hardstock, from 3% to 10% of an emulsifier, and from .2% to 1.0% by weight of citric acid, and the balance comprising a basestock liquid triglyceride and minors such as flavoring and coloring.

Surprisingly, when a high nutrition food spread of the above formulation is utilized and more specifically where the soy protein has been hydrated and subsequently dried, the soy protein seems to lose its characteristic hygroscopic activity and therefore upon mouth contact does not rapidly absorb all available mouth moisture. As a result there is little or no sticky or gritty feeling associated with the mouth eating quality of the food spreads of this invention.

DETAILED DESCRIPTION OF THE INVENTION

Turning first to a description of the high nutrition food spread formulation of this invention, in its broadest sense the formulation is as follows:

| Ingredient | Percent By Weight |
|---|---|
| Hydrated, subsequently dried soy protein | 20–35 |
| Sweetener | 10–25 |
| Hardstock | 1.5–3 |
| Emulsifier | 3–10 |
| citric acid | .2–1.0 |
| Basestock liquid triglyceride oil and minors such flavoring and coloring | Balance |

First in regard to the hydrated, subsequently dried soy protein ingredient, as heretofore briefly mentioned, it has been found critical to this invention that the soy protein, from whatever source, be first hydrated and then subsequently dried. Soy protein is typically available in three common forms, soy flour which is 40% to 70% by weight protein, soy concentrate which has some non-protein materials removed and generally contains from 70% to 90% by weight protein, and soy isolate which generally is above 90% by weight in protein. Typically, these forms of soy protein are prepared by grinding soybean meal to a small particle size, defatting the ground meal by extraction with hexane, and in some cases defatting the soybean meal with methanol in order to reduce the characteristic bitter "beany" flavor associated with soy. However, it is prepared, the soy protein material is quite hygroscopic and therefore upon contact with moisture rapidly adsorbs the available moisture from surrounding water sources. With particular reference to the mouth, if conventionally processed commercially available soy protein is utilized in the nutritional food spread, the soy protein upon mouth contact rapidly absorbs available mouth moisture and in effect dehydrates the mouth, leaving a very sticky, gritty feeling in the mouth. Surprisingly, where the soy protein prior to incorporation in the formulation of this invention is first hydrated at a water-protein ratio of from 1:1 to 3:1, and preferably from 1:1 to 2:1, and subsequently dried, even though the moisture of hydration is driven off during drying, the hygroscopic nature of the soy protein is significantly decreased. Therefore, since the soy protein's water affinity is decreased, upon mouth contact less moisture is absorbed and as a result the stickiness and gritty mouth feel is no longer present. The lower moisture limit of 1:1 is a practical lower limit in that if less water is utilized, difficulties from the standpoint of fluidity exist. On the other hand, if amounts of moisture greater than 3:1 are employed, as a practical matter no advantage is obtained, and of course during the drying procedure excessive amounts of water must be removed. No criticality exists in regard to the method of drying the hydrated soy protein, and it can be dried by oven drying, spray drying, freeze drying, and other conventional drying methods. Preferably, freeze drying is employed because it has been found that hydrated and subsequently freeze dried soy protein is especially suitable for mouth eating and palatability qualities.

The amount of hydrated, subsequently dried soy protein to be utilized in the high nutrition food spread can vary from about 20% to about 35% by weight of the food spread formulation. Preferably, the amount is from 25% to 30% by weight of the food spread formulation. Of course the exact amount employed in any specific formulation will depend upon the amount of protein desired to be added as a nutritional supplement as well as upon the choice of particular protein source, i.e. soy flour which has less percent protein than soy concentrate, which in turn has less protein than soy isolate. Generally, if amounts of soy protein source, from any of the three previously specified sources are utilized in an amount in excess of 35% by weight of the food spread, the bitter beany off-flavor note of soy protein may become a factor. Therefore, amounts in excess of 35% by weight of the food formulation should generally not be employed. Amounts of from 25% to 30% by weight of the hydrated, subsequently dried protein seem to provide an overall balance between the improved eating quality and the reduced soy flavor as well as from the standpoint of providing a significant nutritional supplement.

Turning now to a description of the sweetener, of course the precise amount of sweetener employed in any nutritional food spread formulation will depend upon the sweetness characteristics desired. However, for the formulations of this invention it has been found to be desirable that the amount of sweetener be from 10% to 25% by weight of the formulation, and preferably from 15% to 20% by weight of the formulation. No precise criticality exists with regard to the exact sweeteners employed. Suitable sweeteners include, for example, sucrose, dextrose, fructose, honey, molasses, and artificial sweeteners such as saccharine and the like. Generally, common disaccharides such as sucrose or monosaccharides such as dextrose and fructose are preferred sweeteners.

The hardstock component comprises from 1.5% to 3% by weight of the food spread. As used herein, the term "hardstock" is utilized to refer to a substantially completely hydrogenated vegetable oil such as cottonseed oil, rapeseed oil, safflower seed oil, soybean oil, corn oil, and the like. Preferably, the hardstock component is hydrogenated to a point such that it has an iodine value of less than 10 and most preferably less than 8. A most preferred hardstock component is soybean oil hydrogenated to an iodine value of less than 8. The hardstock component utilized within the range specified is important to the food spread formulation because as is characteristic with peanut compositions, the hardstock component contributes to the overall stability of the emulsion which is formed so that it does not separate into an oil phase and a solids phase such as "old-fashioned" peanut butters often do.

The emulsifier component comprises from 3% to 10% by weight of the food spread formulation and preferably from 4% to 8% by weight of the formulation. The emulsifier component contributes to the overall eating quality of the food spread and in addition, coupled with the use of hydrated, subsequently dried soy protein, practically removes any residual stickiness and gritty eating quality characteristics from the product. Suitable emulsifiers include, but are not limited to, lecithin, fatty monoglycerides, for example, soybean monoglycerides, fatty diglycerides, polyoxyethylene ethers of fatty esters of polyhydric alcohols, propylene glycol monofatty esters such as propylene glycol monostearate, sodium alkyl sulfates, and the like. Preferred emulsifiers are fatty mono- and diglycerides and polyoxyethylene ethers of fatty esters of polyhydric alcohols.

Turning now to the citric acid component which should comprise from 0.2% to 1.0% by weight of the food spread formulation, and preferably from 0.3% to 0.6% by weight of the food spread formulation. The citric acid component of the high nutrition food spreads of this invention is an essential ingredient because it, along with the combination of hydrated dried soy protein and emulsifier, significantly contributes to the overall eating quality of the food spread. Specifically, the amounts of citric acid specified herein are essential to the invention because they help induce mouth salivation because of their characteristic tartness. Therefore, while the soy protein has nowhere near its original characteristic hygroscopic tendencies after treatment in accord with this invention, any water affinity that remains is counteracted by the employed amounts of citric acid which make more than usual amounts of mouth moisture available. As a result, the overall eating quality of the food spread is improved from the standpoint of significantly less stickiness and grittiness. In addition, where the food spread is to be a fruit-flavored food spread, citric acid is a helpful additive in that it contributes some of the characteristic tangy flavors of fruits. Amounts of citric acid of less than 0.2% by weight may be insufficient to provide an increase in available mouth moisture, and amounts in excess of 1.0% may provide too much characteristic tartness to the food spread formulation. The preferred range specified above is 0.3% to 0.6% by weight because this range represents an overall balance between increase in available mouth moisture and providing a desirable amount of tangy flavor notes to the spread.

The balance of the high nutrition food spread comprises a basestock liquid triglyceride and flavorings and colorings. The term "basestock" liquid triglyceride as utilized herein is intended to include liquid triglyceride oils can be derived from coconut oil, olive oil, palm oil, palm kernel oil, peanut oil, rapeseed oil, corn oil, cottonseed oil, safflower oil, sesame seed oil, soybean oil, sunflower seed oil, and the like. It is conceivable that marine oils such as menhaden oil, crambe oil, and whale oil can be employed. However, it is preferred, for obvious reasons of commercial availability, that vegetable oils be employed. The basestock component is important to the food spread formulation because it contributes fluidity to the system as well as spreadability and it provides a suspending medium for the particles of soy protein as well as a fat phase for the hardstock component to be dispersed in. While the basestock component can comprise the balance of the formulation after selecting the amounts of the other ingredients, it is preferred that the weight ratio of basestock component to soy protein be from 0.7:1 to about 2.5:1. The use of triglyceride basestock in these ratios provides an ultimate product of good consistency, characteristic of most food spreads. If amounts of oil in excess of the ratio expressed herein are employed, it may happen that the protein will gum and become dough-ball like. Typically, it has been found that where the amount of basestock oil is 40% to 68% by weight of the food spread, and preferably from 45% to 50% by weight of the food spread formulation, that spreads having suitable spreadability characteristics are obtained.

The balance of the food spread formulations of this in-invention comprises minors such as flavoring and coloring. While the amount of flavoring is dependent upon the exact flavor intensity one desires, as a general guideline the amount in the formulations of this invention should be within the range of from .2% to 1.5% by weight of the food spread, and preferably within the range of from .2% to .7% by weight of the food spread. Of course the specific flavor chosen depends upon the ultimate product flavor desired, and flavors such as vanilla, chocolate, butter, cinnamon, maple, nut flavoring, fruit flavorings such as oil of tangerine, orange oil, lemon oil, and the like can be employed. Generally it has been found that fruit flavors function especially well in the food spread formulations of this invention.

Of course, conventional food approved colorants can be added to provide an imparted color to the product.

Turning now to a description of the process of preparing the food spread formulation of this invention, the first step comprising prior preparation of the soy protein. The soy protein is mixed with water within the previously described weight ratios, and thoroughly blended in, for example, a Hobart mixer. The mixture is then dried by conventional drying methods and preferably reground or homogenized to a finely divided particle state prior to final processing. The product may be reground dry after dehydration or may be homogenized after blending with the other ingredients.

The remaining ingredients other than the hydrated dried protein are combined and heated to a temperature generally within the range of from 130° F. to 140° F. which is sufficient to insure that the hardstock component will melt in the basestock oil. While at such temperatures the hydrated and subsequently dried soy protein is preferably incrementally added to the heated mixture of all other ingredients while continuous mixing occurs. Thereafter the fully mixed formulation is rapidly cooled from temperatures within the range of from 130° F. to 140° F. down to temperatures of from 70° F. to 90° F. by passing the mixture through a scraped wall freezer to crystallize the hardstock component and the emulsifier within the basestock oil. The product is then filled into containers and tempered for example in conventional fashion to provide a product ready for sale. Since tempering techniques are known in the shortening technology as well as the peanut butter technology, detained descriptions of those will not be given herein. For further specific details see U.S. Pat. 3,619,207, Dzurik et al., filed Aug. 14, 1969, Ser. No. 850,049, entitled "Peanut Butter Containing Homogenized Peanut Paste," issued Nov. 9, 1971.

The following Example is offered to illustrate the preparation and formulation as well as product characteristics of the food spreads of this invention.

EXAMPLE 1

A food spread of the following formulation was prepared:

| Ingredient | Percent By Weight |
|---|---|
| Soybean protein isolate (Edi-Pro-N hydrated and freeze dried as described below) | 30 |
| Sucrose | 22 |
| Soybean oil basestock having an iodine value of 108 | 40.65 |
| Hardstock (hardened soybean oil to an iodine value of 8) | 2.5 |
| Emulsifier (Duex and Tween 60 which are polyoxyethylene ethers of fatty esters of polyhydric alcohols) | 4 |
| Finely ground citric acid | 0.5 |
| Flavoring (oil of tangerine) | 0.35 |
| | 100 |
| Extra: red and yellow No. 5 Lake (color dyes 1:1 ratio) | Extra |

Prior to preparing the above described formulation the soybean protein isolate was mixed with water at a water-to-protein ration of 2:1 by blending the water and protein mixture in a Hobart mixer. The hydrated soybean protein was then freeze dried and ground to a fine grind size. Thereafter all ingredients other than the hydrated freeze-dried protein were placed in a mixing bowl equipped with a water bath so that it was capable of being heated to at least 150° F in order to melt the hardstock component to insure uniform mixing with all other ingredients. The ingredients, other than the soy protein, were mixed thoroughly in the mixer keeping the temperature at above 150° F. in order to insure that the mixture maintained fluidity. During mixing the hydrated freeze-dried protein was added by incremental amounts until complete addition occurred. Thereafter the initially mixed product was passed through a homogenizer, i.e. an Eppenbach homomixer, which is a high shear rotating shaft mixer. This mixing reduced the particle size and further increased the dispersion of the ingredients. To further insure ultimate reduction in grittiness, the product was homogenized in a high pressure homogenizer such as that described in the previously incorporated Dzurik et al. patent to obtain a particle size estimated to be of less than 80 microns with an average of 10 to 20 microns.

Thereafter the product was "finished" as described below. In order to insure stability of the protein-supplemented food spread, crystallization of the solids in the fat phase was controlled utilizing conventional techniques. This is important in order to allow the hardstock component to form a matrix of desirable phase fat crystals with the other ingredients in the spread. The desired crystal structure was obtained by quickly cooling the hot mixture by passing the mixture through a scraped wall heat exchanger (freezer) wherein it was rapidly reduced in temperature down to about 75° F. in a matter of minutes. Ice water was used as a coolant in the heat exchanger. Since some crystal growth continues after freezing the food spread, the spread was placed in an 80° F. constant temperature room and left there for 48 hours. This technique is commonly known as "tempering." The resulting spread was evaluated for spreadability characteristics, mouth eating quality, flavor, and presence of soy taste.

A panel of experts examined the product for each of the above specified characteristics and noted the product to be of excellent spreadability and high gloss as well as a product of good stability. Upon tasting the product did not exhibit mouth stickiness and grittiness usually characteristic of soy protein-supplemented foods. In addition, little or no soy off-flavor was noted.

In this Example the total amount of soy protein-supplemented tangerine flavored food spread prepared was 2000 grams.

What is claimed is:

1. A high nutrition food spread comprising from 20 to 35 weight percent of hydrated and subsequently dried soy protein, from 10 to 25 weight percent of sweetener, from 1.5 to 3 weight percent of a substantially completely hydrogenated vegetable oil hardstock, from 3 to 10 weight percent of emulsifier, from 0.2 to 1.0 weight percent of citric acid, and the balance comprising a basestock liquid triglyceride, flavoring and coloring; said hydrated and subsequently dried soy protein being prepared by hydrating soy protein selected from the group consisting of soy flours, soy concentrates and soy isolates with water at a water-to-protein ratio of from 1:1 to 3:1 and drying the hydrated soy protein.

2. The food spread of Claim 1 wherein the amount of protein is from 25 to 30 weight percent.

3. The food spread of Claim 2 wherein the protein is freeze-dried protein.

4. The food spread of Claim 3 wherein the protein prior to incorporation in the food spread is size reduced to a fine grind size.

5. The food spread of Claim 1 wherein the hardstock is triglyceride oil hardened to an IV of less than 10.

6. The food spread of Claim 5 wherein the hardstock is selected from a group consisting of soybean, rapeseed and cottonseed hardstock.

7. The food spread of Claim 1 wherein the amount of citric acid is from 0.3% to 0.6% by weight.

8. The food spread of Claim 1 wherein the water-to-protein ratio in the hydrating step is from 1:1 to 2:1.

9. The food spread of Claim 1 wherein the emulsifier is selected from a group consisting of lecithin, fatty mono- and diglycerides, and polyoxyethylene ethers of fatty esters of polyhydric alcohols.

10. The food spread of Claim 1 wherein the basestock is soybean oil.

References Cited

UNITED STATES PATENTS

| | | | |
|---|---|---|---|
| 3,346,390 | 10/1967 | Pichel et al. | 426—199 X |
| 3,469,991 | 9/1969 | Hawley | 426—199 X |

JAMES R. HOFFMAN, Primary Examiner

U.S. Cl. X.R.

426—195, 199

PO-1050
(5/69)

UNITED STATES PATENT OFFICE
CERTIFICATE OF CORRECTION

Patent No. 3,851,070          Dated November 26, 1974

Inventor(s) Frank E. Sessoms and Michael E. Hardy

It is certified that error appears in the above-identified patent and that said Letters Patent are hereby corrected as shown below:

Column 4, line 36, insert a period after "oils". Before "can" insert -- Usually these oils are partially hydrogenated to an iodine value of 80 or above. Suitable liquid oils --.

Signed and sealed this 4th day of March 1975.

(SEAL)
Attest:

RUTH C. MASON
Attesting Officer

C. MARSHALL DANN
Commissioner of Patents
and Trademarks